United States Patent
Ohmura

(10) Patent No.: US 8,905,438 B2
(45) Date of Patent: Dec. 9, 2014

(54) TONGUE PLATE AND VEHICLE SEATBELT APPARATUS

(71) Applicant: Yukito Ohmura, Nagoya (JP)

(72) Inventor: Yukito Ohmura, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/908,295

(22) Filed: Jun. 3, 2013

(65) Prior Publication Data
US 2013/0334863 A1    Dec. 19, 2013

(30) Foreign Application Priority Data
Jun. 15, 2012   (JP) ................................. 2012-135992

(51) Int. Cl.
B60R 22/00    (2006.01)
A44B 11/25    (2006.01)
B60R 22/18    (2006.01)

(52) U.S. Cl.
CPC ..... *A44B 11/2561* (2013.01); *B60R 2022/1812* (2013.01); *B60R 22/00* (2013.01); *B60R 22/18* (2013.01)
USPC .................... 280/801.1; 24/588.11; 24/589.1; 24/593.1

(58) Field of Classification Search
USPC .............. 280/801.1; 24/588.11, 589.1, 593.1, 24/633, 265 BR
See application file for complete search history.

(56) References Cited

U.S. PATENT DOCUMENTS

| | | | |
|---|---|---|---|
| 4,903,377 A * | 2/1990 | Doty ................................ | 24/194 |
| 2005/0115031 A1* | 6/2005 | Tanaka ...................... | 24/265 BC |
| 2006/0097503 A1 | 5/2006 | Kiyomizu et al. | |
| 2007/0039144 A1 | 2/2007 | Ichida et al. | |
| 2010/0180409 A1* | 7/2010 | Ito ................................. | 24/593.1 |
| 2013/0174390 A1* | 7/2013 | Muromachi et al. ............ | 24/633 |
| 2013/0318753 A1* | 12/2013 | Nakai et al. .................. | 24/593.1 |

FOREIGN PATENT DOCUMENTS

| | | |
|---|---|---|
| JP | 2001-010444 A | 1/2001 |
| JP | 2006-131087 A | 5/2006 |
| JP | 2007-076635 A | 3/2007 |
| JP | 2009-006745 A | 1/2009 |

* cited by examiner

*Primary Examiner* — Toan To
(74) *Attorney, Agent, or Firm* — Gifford, Krass, Sprinkle, Anderson & Citkowski, P.C.

(57) ABSTRACT

A tongue plate includes a grasping portion through which the webbing for restraining an occupant is being inserted and a plate portion including an engaging portion. The engaging portion is integrated with the grasping portion, and extends from the grasping portion, and is able to engage with a buckle device of a vehicle. The grasping portion includes a pair of side surfaces. The side surfaces form a portion of an outer peripheral surface of the grasping portion when viewed from a plate thickness direction of the plate portion, and are arranged one on each side portion in a width direction of the grasping portion. The side surfaces are arranged such that a width dimension of the grasping portion on the engaging portion side of the grasping portion is larger than a width dimension of the grasping portion on a side opposite the engaging portion side of the grasping portion.

8 Claims, 14 Drawing Sheets

F I G . 10
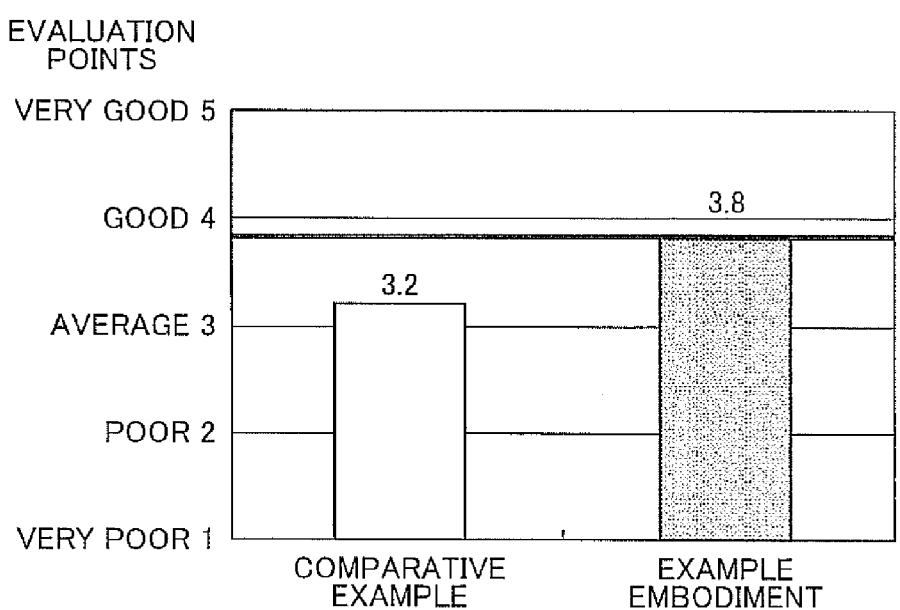

TONGUE PLATE AND VEHICLE SEATBELT APPARATUS

INCORPORATION BY REFERENCE

The disclosure of Japanese Patent Application No. 2012-135992 filed on Jun. 15, 2012 including the specification, drawings and abstract is incorporated herein by reference in its entirety.

BACKGROUND OF THE INVENTION

1. Field of the Invention

The invention relates to a tongue plate and a vehicle seatbelt apparatus provided with this tongue plate.

2. Description of Related Art

A vehicle seatbelt apparatus described in Japanese Patent Application Publication No. 2007-76635 (JP 2007-76635 A) includes a tongue plate that is movably provided on webbing. This tongue plate includes a tongue plate core, and a grasping portion that covers a portion of this tongue plate core. A grip portion is formed on both side portions in a width direction of the grasping portion. Then webbing is withdrawn from a retractor by an occupant grasping the grasping portion and pulling the tongue plate.

However, with this vehicle seatbelt apparatus, both side portions in the width direction of the grasping portion are arranged parallel when viewed from a plate thickness direction of the tongue plate core, so the ease with which the grasping portion is grasped (i.e., the grasping ease of the grasping portion) differs depending on the size of the hand (from the palm to the fingertips) of the occupant. Also, winding force of the retractor acts on the grasping portion when the webbing is withdrawn from the retractor. The direction in which the winding force acts substantially matches the direction in which both side portions in the width direction of the grasping portion extend, so both side portions in the width direction of the grasping portion tend to slip out of the hand of the occupant. Therefore, there is room for improvement in terms of improving the grasping ease of the grasping portion.

SUMMARY OF THE INVENTION

The invention thus provides a tongue plate capable of improving the grasping ease of a grasping portion.

A first aspect of the invention relates to a tongue plate that includes a grasping portion and a plate portion. Webbing for restraining an occupant is inserted through the grasping portion. Also, the plate portion includes an engaging portion that is integrated with the grasping portion, and extends from the grasping portion. When the occupant fastens the webbing, the occupant grasps the grasping portion of the tongue plate, and engages the engaging portion of the plate portion with a buckle device of a vehicle, such that the webbing is fastened across the body of the occupant.

Here, a portion of an outer peripheral surface of the grasping portion when viewed from a plate thickness direction of the plate portion is formed by a pair of side surfaces. The pair of side surfaces are arranged one on each side portion in a width direction of the grasping portion. Also, the pair of side surfaces are arranged such that a width dimension of the grasping portion on the engaging portion side of the grasping portion is larger than a width dimension of the grasping portion on a side opposite the engaging portion side of the grasping portion. That is, the width dimension of the grasping portion on the engaging portion extending direction side of the grasping portion (i.e., the side of the grasping portion from which the engaging portion extends) is set larger than the width dimension of the grasping portion on a side opposite the engaging portion extending direction side (i.e., the side of the grasping portion that is opposite the side from which the engaging portion extends).

As a result, when an occupant with small hands (from the palm to the finger tips) grasps the grasping portion, the occupant is able to mainly grasp the portion where the width dimension of the grasping portion is small, and when an occupant with large hands grasps the grasping portion, the occupant is able to mainly grasp the portion where the width dimension of the grasping portion is large. Therefore, a difference in grasping ease due to the size of the hands of the occupant is able to be minimized.

Also, when engaging the tongue plate with, the buckle device of the vehicle, the engaging portion of the tongue plate is pulled toward the buckle device, so winding force that acts on the tongue plate from a retractor that stores the webbing acts in a direction opposite the extending direction of the engaging portion (i.e., opposite the direction in which the engaging portion is pulled toward the buckle device). Also, as described above, the width dimension of the grasping portion on the engaging portion extending direction side of the grasping portion is set larger than the width dimension of the grasping portion on the side opposite the engaging portion extending direction side of the grasping portion. When the side surfaces are arranged inclined with respect to the width direction of the grasping portion in this way, the direction in which the side surfaces are inclined, i.e., the direction in which the width of the grasping portion widens, does not match the direction of the winding force that acts on the tongue plate. Therefore, when engaging the tongue plate with the buckle device of the vehicle, the occupant is able to grasp the grasping portion taking the pair of side surfaces against the winding force that acts on the tongue plate. As a result, the grasping ease of the grasping portion is able to be improved.

With the tongue plate described above, the side surfaces may be arranged inclined with respect to the width direction of the grasping portion when viewed from the plate thickness direction of the plate portion, and an angle created by the side surfaces with respect to the width direction of the grasping portion may be set to between 64° and 77°, inclusive. As a result, the grasping ease of the grasping portion is able to be further improved.

That is, if the angle created by the side surfaces with respect to the width direction of the grasping portion is set to less than 64°, when the occupant places his or her fingers on the side surfaces and grasps the grasping portion, the fingers of the occupant tend to slip on the side surfaces toward the side of the grasping portion where the width dimension is small, and as a result, the grasping ease of the grasping portion deteriorates.

On the other hand, if the angle created by the side surfaces with respect to the width direction of the grasping portion is set to greater than 77°, the direction in which winding force acts on the tongue plate and the direction in which the inclined surfaces become inclined come closer to matching each other when the tongue plate is engaged with the buckle device. Therefore, when engaging the tongue plate with the buckle device, the fingers of the occupant tend to slip on the inclined surface. As a result, the grasping ease of the grasping portion deteriorates.

In contrast, by setting the angle created by the side surfaces with respect to the width direction of the grasping portion to between 64° and 77°, inclusive, slipping of the hand (i.e., the fingers) of the occupant on the inclined surfaces is suppressed, so grasping ease of the grasping portion is able to be even further improved.

With the tongue plate described above, a length of each of the side surfaces when viewed from the plate thickness direction of the plate portion may be set to between 25.2 mm and 40 mm, inclusive. Accordingly, even when an occupant with relatively large hands (i.e., an occupant corresponding to JM95 (a Japanese adult male of a height that is within the shortest 95% when Japanese adult males are lined up in order from shortest to tallest) grasps the grasping portion, the fingers of the occupant are able to be inhibited from slipping from the side surfaces toward the top surface side and the bottom surface side. Therefore, the length of the side surfaces is able to be set to a length sufficient to enable the occupant to grasp the grasping portion.

With the tongue plate described above, the outer peripheral surface of the grasping portion may also include a top surface. The top surface connects together end portions of the side surfaces that are on the side opposite the engaging portion side of the side surfaces. Also, an opening of a through-hole through which the webbing is inserted may be formed in the top surface, and the opening may be arranged between both end portions in a width direction of the top surface. Therefore, the opening is not arranged in the side surfaces, so the side surfaces are formed by continuous surfaces. As a result, the contact area between the side surfaces and the fingers of the occupant when the occupant places his or her fingers on the side surfaces and grasps the grasping portion is able to be ensured.

Moreover, when the webbing moves relatively in the width direction with respect to the grasping portion, for example, the edge portions of the webbing will abut against both side portions in the width direction of the opening, such that contact between the webbing and the fingers of the occupant is able to be inhibited. As a result, the grasping ease of the grasping portion of the tongue plate is able to be effectively improved.

With the tongue plate described above, the width dimension of the grasping portion at a center position in an inclining direction (hereinafter simply referred to as the "inclining direction center position") of each of the side surfaces when viewed from the plate thickness direction of the plate portion may be set to between 73 mm and 74 mm, inclusive, and a maximum width dimension of the grasping portion may be set to 76.1 mm or less.

With this tongue plate, the width dimension of the grasping portion at the inclining direction center position of the side surfaces is set to 73 mm or more, so the insertion hole through which the webbing is inserted is able to be formed in the grasping portion, for example. Also, by setting the width direction of the grasping portion at the inclining direction center position of the side surfaces to 74 mm or less, and setting the maximum width dimension of the grasping portion to 76.1 mm or less, the grasping portion is able to be grasped well even by an occupant with relatively small hands (e.g., an occupant corresponding to AF05 (i.e., an American adult female of a height that is within the shortest 5% when American adult females are lined up in order from shortest to tallest)). That is, by setting the width dimension of the grasping portion at the inclining direction center position of the side surfaces to 74 mm or less and setting the maximum width dimension of the grasping portion to 76.1 mm or less, it is possible to keep the hand of the occupant from being stretched when the occupant grasps the grasping portion. As a result, a width dimension of the grasping portion that enables the occupant to better grasp the grasping portion is able to be set.

With the tongue plate described above, a thickness dimension of the grasping portion at an inclining direction center position of each of the side surfaces when viewed from the plate thickness direction of the plate portion may be set to between 11 mm and 13.5 mm, inclusive. Therefore, the outer peripheral surface of the grasping portion is arranged so as to fit in the fingers of the occupant when the occupant grasps the grasping portion. As a result, a thickness dimension of the grasping portion that enables the occupant to better grasp the grasping portion is able to be set.

Furthermore, with the tongue plate described above, a surface on one side, in the plate thickness direction of the plate portion, of the grasping portion may be curved in a spherical shape so as to protrude toward one side in the plate thickness direction of the plate portion. Therefore, the grasping ease of the grasping portion is able to be even more effectively improved. That is, the grasping portion fits inside the hand of the occupant by the occupant grasping the grasping portion by wrapping his or her hand around a surface of the grasping portion, on one side in the plate thickness direction of the plate portion. As a result, the grasping ease of the grasping portion is able to be even more effectively improved.

A second aspect of the invention relates to a vehicle seatbelt apparatus that includes the tongue plate described above, the webbing, and a retractor. The webbing is formed in a long band shape. Also, the retractor includes a spool. The spool winds the webbing by being rotated in a winding direction, and the spool is rotated in a withdrawing direction by the webbing being withdrawn.

This vehicle seat belt includes the tongue plate described above, so the grasping ease when the occupant grasps the grasping portion of the tongue plate in order to fasten the webbing is able to be improved.

The tongue plate described above, the grasping portion may includes the top surface and a pair of bottom surfaces. The top surface may be a portion of the outer peripheral surface, and be a surface that connects together end portions of the side surfaces that are on a side opposite the engaging portion side of the side surfaces. The bottom surfaces may be portions of the outer peripheral surface, and be surfaces that connect end portions on the engaging portion side of the side surfaces to the plate portion.

The angle created by the side surfaces with respect to the width direction of the grasping portion is the angle at which a line that connects a boundary between the top surface and the side surfaces to the boundary between the side surfaces and a bottom surface is inclined with respect to the width direction of the grasping portion, when the side surfaces are curved when viewed from the plate thickness direction of the plate portion, for example. Also, when the top surface and the side surfaces are connected by an angle R and the side surfaces and the bottom surface are connected by an angle R, the angle created by the side surfaces with respect to the width direction of the grasping portion is the angle at which a line that connects the center of the angle R that connects the top surface to the side surfaces, to the center of the angle R that connects the side surfaces to the bottom surface, is inclined with respect to the width direction of the grasping portion.

The length of the side surfaces refers to the length of the side surfaces from the boundary between the top surface and the side surfaces to the boundary between the side surfaces and the bottom surface, when viewed from the plate thickness direction of the plate portion. Also, when the top surface is connected to the side surfaces by an angle R and the side surfaces are connected to the bottom surface by an angle R, the length of the side surfaces refers to the length of the side surfaces from the center point of the angle R that connects the top surface to the side surfaces, to the center point of the angle R that connects the side surfaces to the bottom surface, when viewed from the plate thickness direction of the plate portion.

As described above, the tongue plate of the invention enables the grasping ease of the grasping portion to be improved.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 10 is a graph showing an evaluation of grasping ease between the tongue plate of the comparative example and the tongue plate shown in FIG. 1;

DETAILED DESCRIPTION OF EMBODIMENTS

Figure 2:
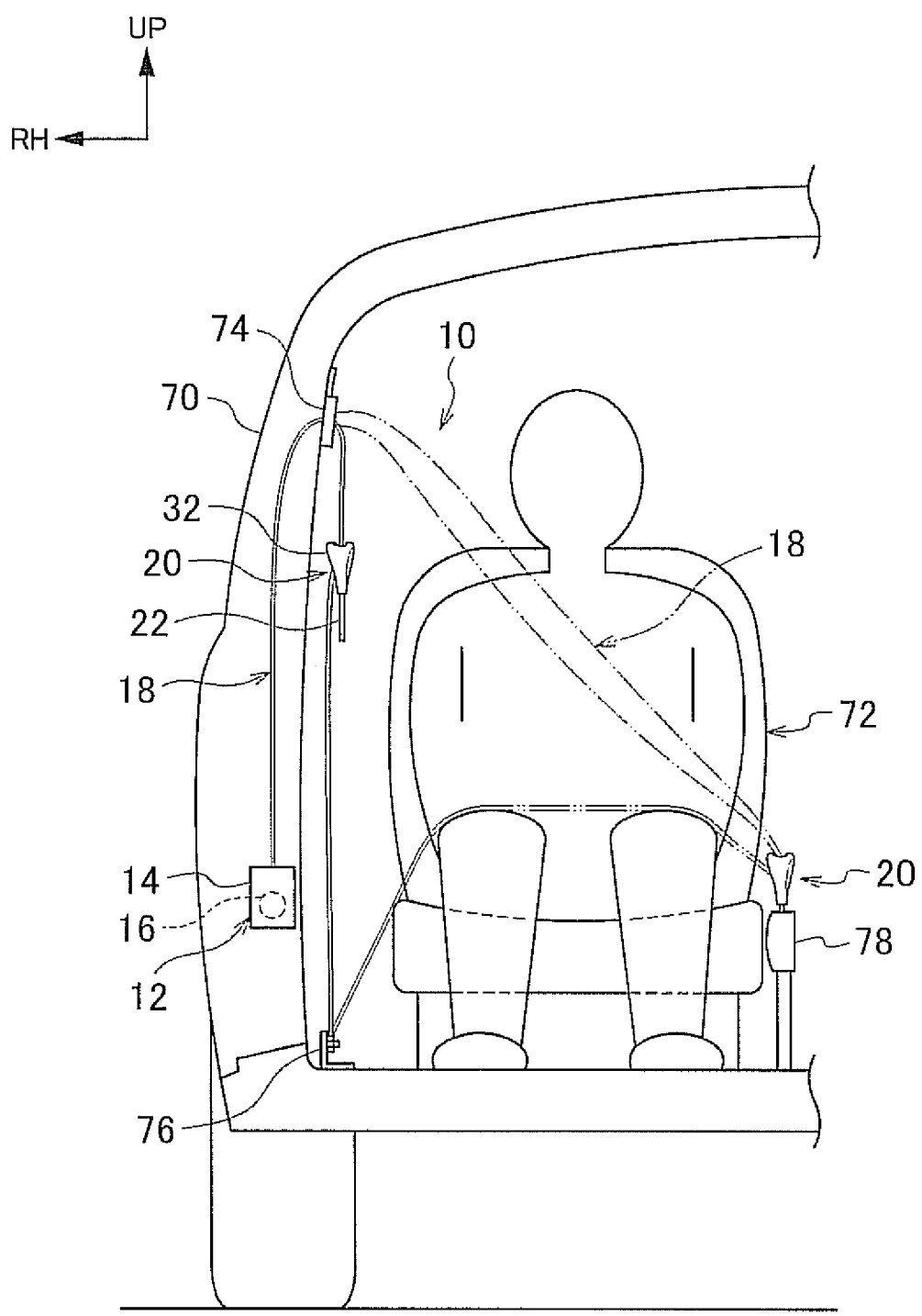
FIG. 2 is a front view, as viewed from a front of a vehicle, of an entire vehicle seatbelt apparatus that uses the tongue plate shown in FIG. 1.

FIG. 2 is a front view, as viewed from a front of a vehicle, of an entire vehicle seatbelt apparatus 10 that uses a tongue plate 20 according to an example embodiment of the invention. In the drawing, arrow FR indicates a direction toward the front of the vehicle, arrow RH indicates a direction toward the right side of the vehicle (i.e., the outside in the vehicle width direction) as viewed by an occupant, and arrow UP indicates a direction upward with respect to the vehicle.

As shown in the drawing, the vehicle seatbelt apparatus 10 includes a retractor 12 that is arranged inside of a center pillar 70 of the vehicle, a webbing 18 that extends from the retractor 12 and restrains the body of an occupant, and a tongue plate 20 that is provided on the webbing 18. Also, the vehicle seatbelt apparatus 10 is provided on the vehicle right side of a seat 72 of the vehicle (i.e., a passenger's side seat in this example embodiment) as viewed by the occupant.

The retractor 12 includes a frame 14, and the retractor 12 is fixed to a vehicle body by the frame 14 being fixed to the vehicle body. A spool 16 is provided inside of the frame 14. The spool 16 is formed in a generally cylindrical shape overall, and is rotatably supported on the frame 14 with the axial direction being the vehicle longitudinal direction. A base end portion of the webbing 18 that will be described later is connected to the spool 16. When the spool 16 is rotated in a winding direction, the webbing 18 is wound up on an outer peripheral portion of the spool 16 from the base end side of the webbing 18. On the other hand, when the webbing 18 is pulled from a tip end side thereof, the webbing 18 is withdrawn from the retractor 12 while the spool 16 rotates in a withdrawing direction (i.e., an unwinding direction) as a result. Also, an urging spring, not shown, is connected to the spool 16. This urging spring is formed as a spiral spring, and the spool 16 is urged in the winding direction by this urging spring. As a result, winding force acts on the webbing 18 by this urging spring.

The webbing 18 is formed in a long band shape. One end portion (i.e., the base end portion) in the length direction of the webbing 18 is connected to the spool 16 described above, and the webbing 18 extends from the retractor 12 upward with respect to the vehicle, with the plate thickness direction being the vehicle width direction. Then the webbing 18 is folded back downward with respect to the vehicle by a shoulder anchor 74 of the vehicle, and the other end portion (i.e., the tip end portion) in the length direction of the webbing 18 is fixed to an anchor 76 of the vehicle.

Figure 1:
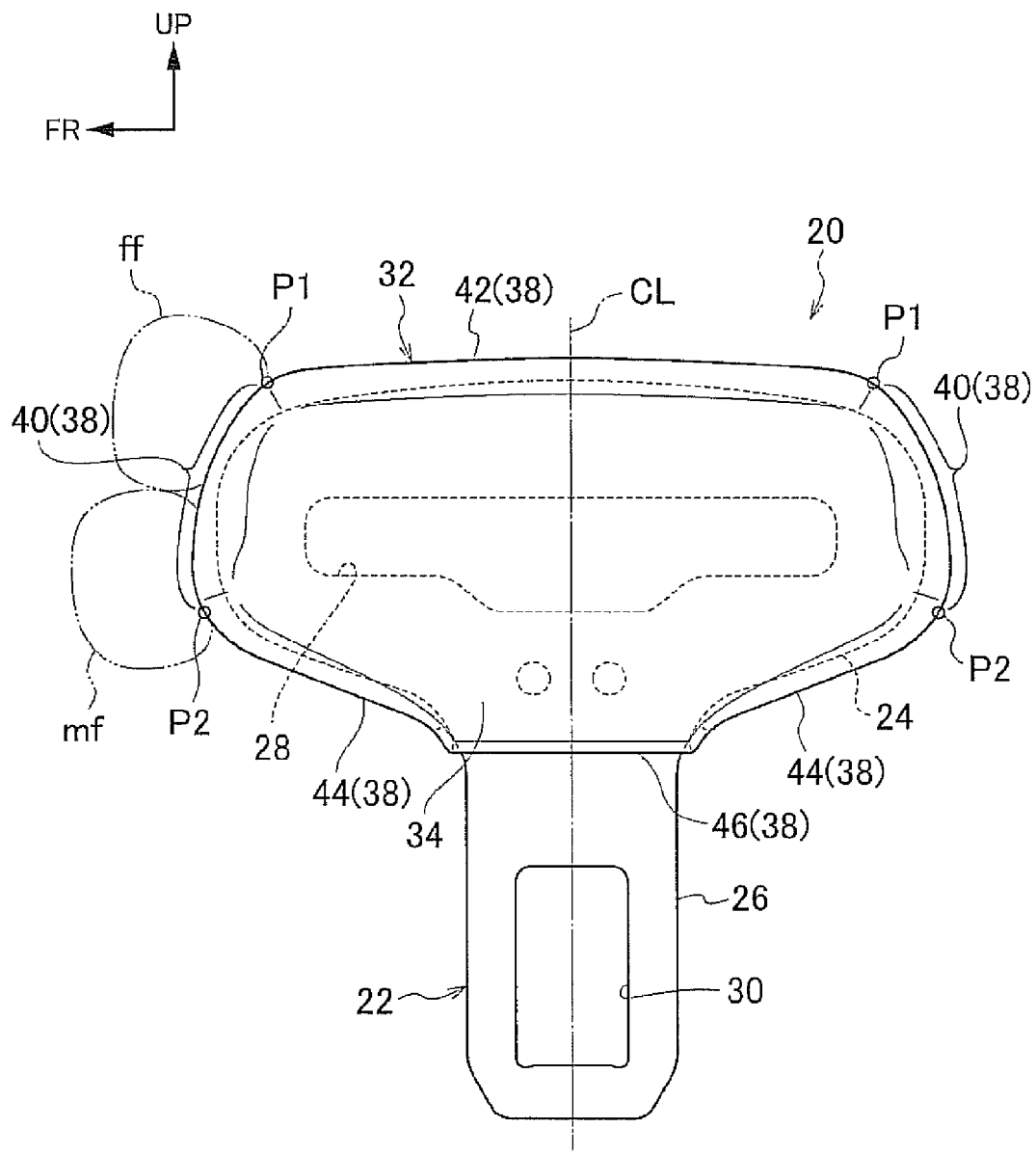
FIG. 1 front view of a tongue plate according to one example embodiment of the invention.

The tongue plate 20 is provided on the webbing 18, and is able to move in the length direction of the webbing 18 with respect to the webbing 18. Also, as shown in FIG. 1, the tongue plate 20 is formed symmetrical with respect to a center line CL in the vehicle vertical direction, when viewed from the inside in the vehicle width direction, and includes a plate portion 22 and a grasping portion 32. A direction substantially orthogonal to the plate thickness direction of the tongue plate 20 and the vehicle vertical direction (or the center line CL) is the width direction of the tongue plate 20.

The plate portion 22 is made of metal, and is formed in a general T-shaped plate shape when viewed from the plate thickness direction of the plate portion 22. Also, the plate portion 22 includes a core portion 24 that forms an upper portion of the plate portion 22, and an engaging portion 26 that forms a lower portion of the plate portion 22.

Figure 5:
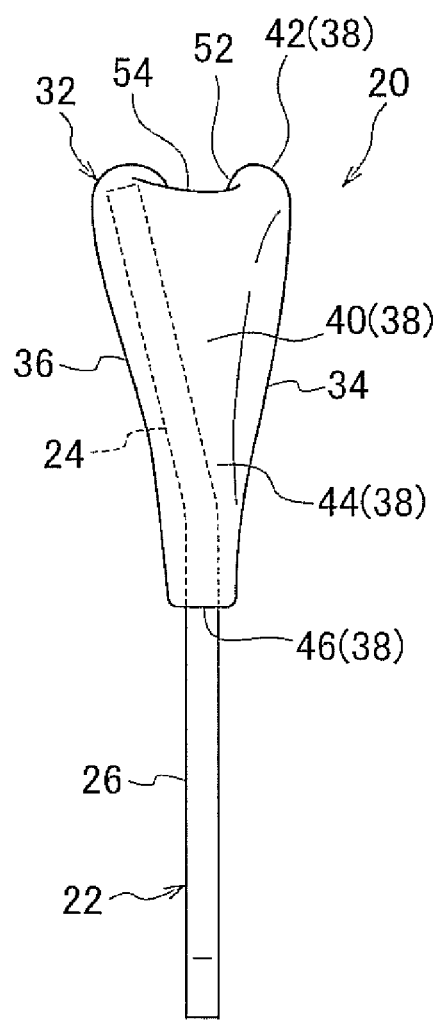
FIG. 5 is a side view of the tongue plate shown in FIG. 3.

As shown in FIG. 5, this plate portion 22 is bent at a center position in the vehicle vertical direction. When viewed from the side, the core portion 24 is inclined to the right side of the vehicle in FIG. 5 (i.e., a back surface 36 side of the tongue plate 20) as it extends upward with respect to the vehicle. Moreover, as shown in FIG. 1, the core portion 24 is covered by the grasping portion 32 that will be described later, and a generally rectangular-shaped through-hole 28 is formed in substantially a center portion of the core portion 24.

The engaging portion 26 extends from the core portion 24 downward with respect to the vehicle. A generally rectangular-shaped engaging hole 30 is formed through a tip end portion (i.e., a lower end portion) of the engaging portion 26. Also, the engaging portion 26 engages with a buckle device 78 of the vehicle, such that the tongue plate 20 becomes fastened to the buckle device 78, by the engaging portion 26 being inserted into the buckle device 78 (see FIG. 2).

The grasping portion 32 is made of resin, and is integrally formed with the plate portion 22 so as to cover the core portion 24. The grasping portion 32 is formed in a generally hexagonal shape when viewed from the plate thickness direction of the plate portion 22, and when viewed from the side, the thickness of the grasping portion 32 is set to become increasingly thicker farther upward with respect to the vehicle (see FIG. 5).

Figure 3:
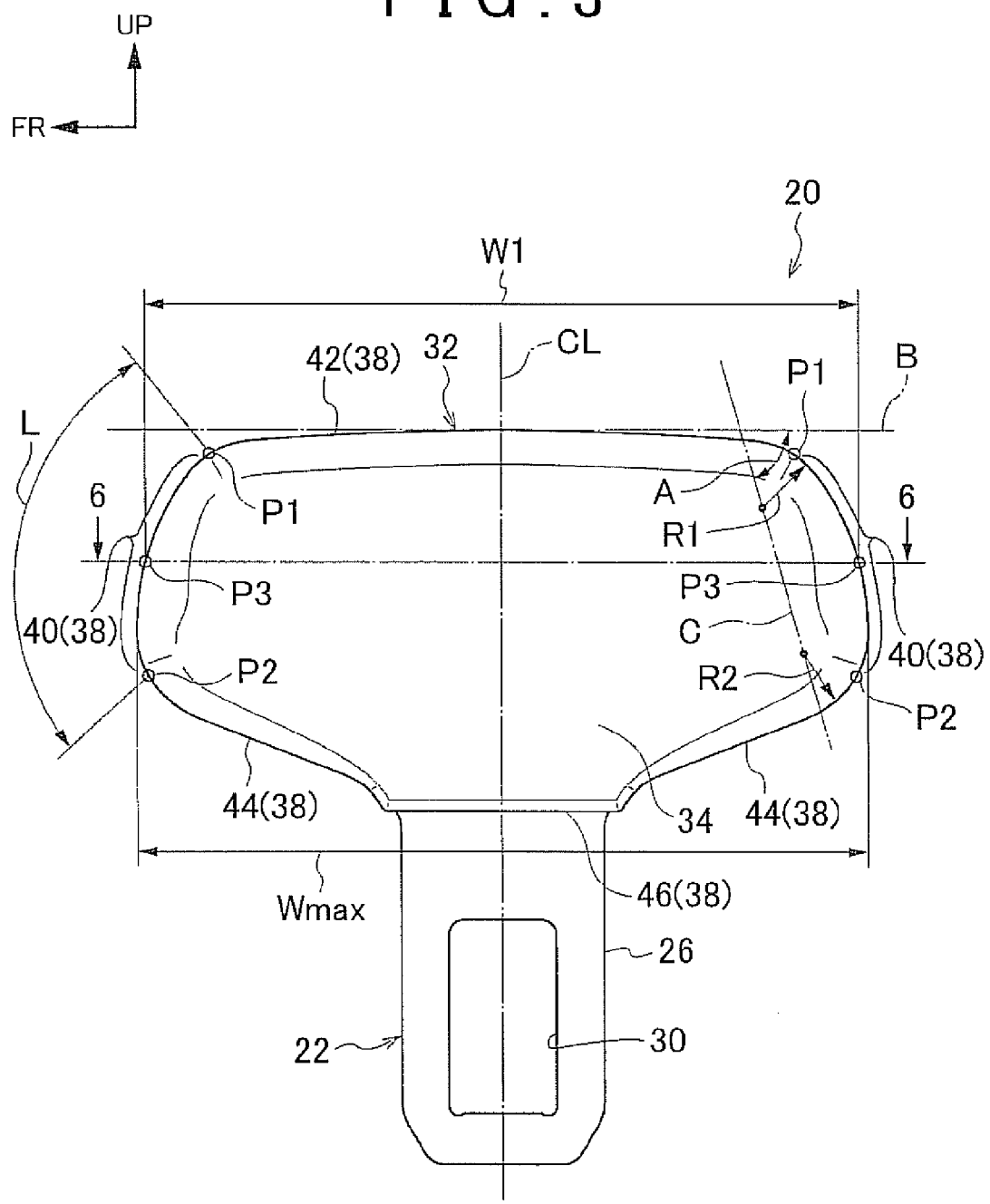
FIG. 3 is a front view illustrating the shape of an outer peripheral portion of the tongue plate shown in FIG. 1.

As shown in FIG. 3, an outer peripheral surface 38 of the grasping portion 32 when viewed from one side in the plate thickness direction of the plate portion 22 (i.e., from the front surface 34 side of the grasping portion 32) includes a pair of inclined surfaces 40 as "side surfaces", a top surface 42, and a pair of first bottom surfaces 44 and a second bottom surface 46 as "bottom surfaces".

The pair of inclined surfaces 40, when viewed from the front surface 34 side of the grasping portion 32, are inclined in a direction away from each other in the extending direction of the engaging portion 26 (i.e., farther downward with respect to the vehicle), and are curved so as to protrude toward the outside of the grasping portion 32. That is, the width dimension of the grasping portion 32 is set so as to increase in the extending direction of the engaging portion 26. In this specification, portions such as the inclined surfaces 40 that are provided in plurality may also be described in the singular tense to facilitate understanding.

The top surface 42, when viewed from the front surface 34 side of the grasping portion 32, extends in the width direction of the tongue plate 20, and is curved so as to protrude toward the outside of the grasping portion 32. Both end portions in the length direction of this top surface 42 are connected to the upper end portions of the inclined surfaces 40. The connecting portions where both end portions in the length direction of this top surface 42 are connected to the upper end portions of the inclined surfaces 40 are curved at an angle R1 so as to protrude toward the outside of the grasping portion 32 when viewed from the front surface 34 side of the grasping portion 32.

The first bottom surfaces 44 extend from the lower end portions of the inclined surfaces 40 toward the plate portion 22 (i.e., the engaging portion 26), and are arranged inclining downward with respect to the vehicle toward the center line CL when viewed from the front surface 34 side of the grasping portion 32. End portions on the outside in the width direction of the first bottom surfaces 44 are connected to the lower end portions of the inclined surfaces 40, and the connecting portions where the end portions on the outside in the width direction of the first bottom surfaces 44 are connected to the lower end portions of the inclined surfaces 40 are curved at an angle R2 so as to protrude toward the outside of the grasping portion 32 when viewed from the front surface 34 side of the grasping portion 32.

The second bottom surface 46 extends in the width direction of the tongue plate 20 to connect the end portions on the inside in the width direction of the first bottom surfaces 44 together. Also, the engaging portion 26 of the plate portion 22 extends downward from the second bottom surface 46.

Figure 4:
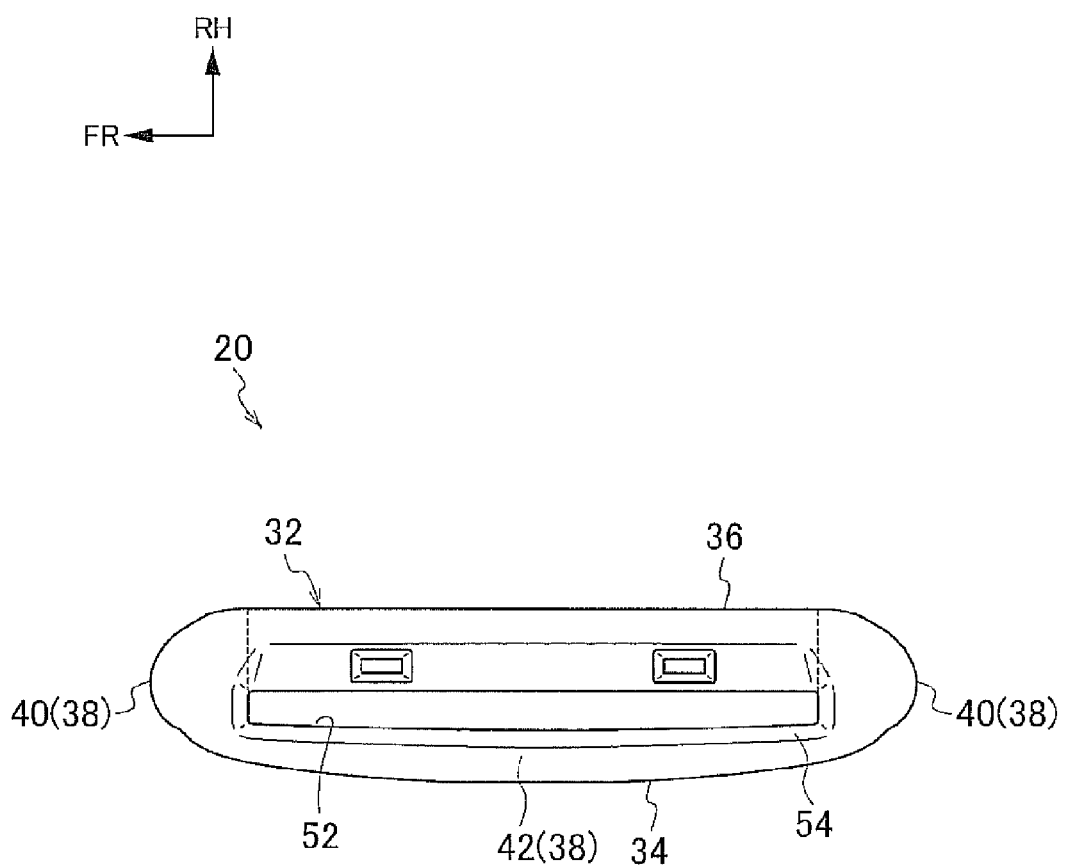
FIG. 4 is a plan view of the tongue plate shown in FIG. 3.
Figure 7:
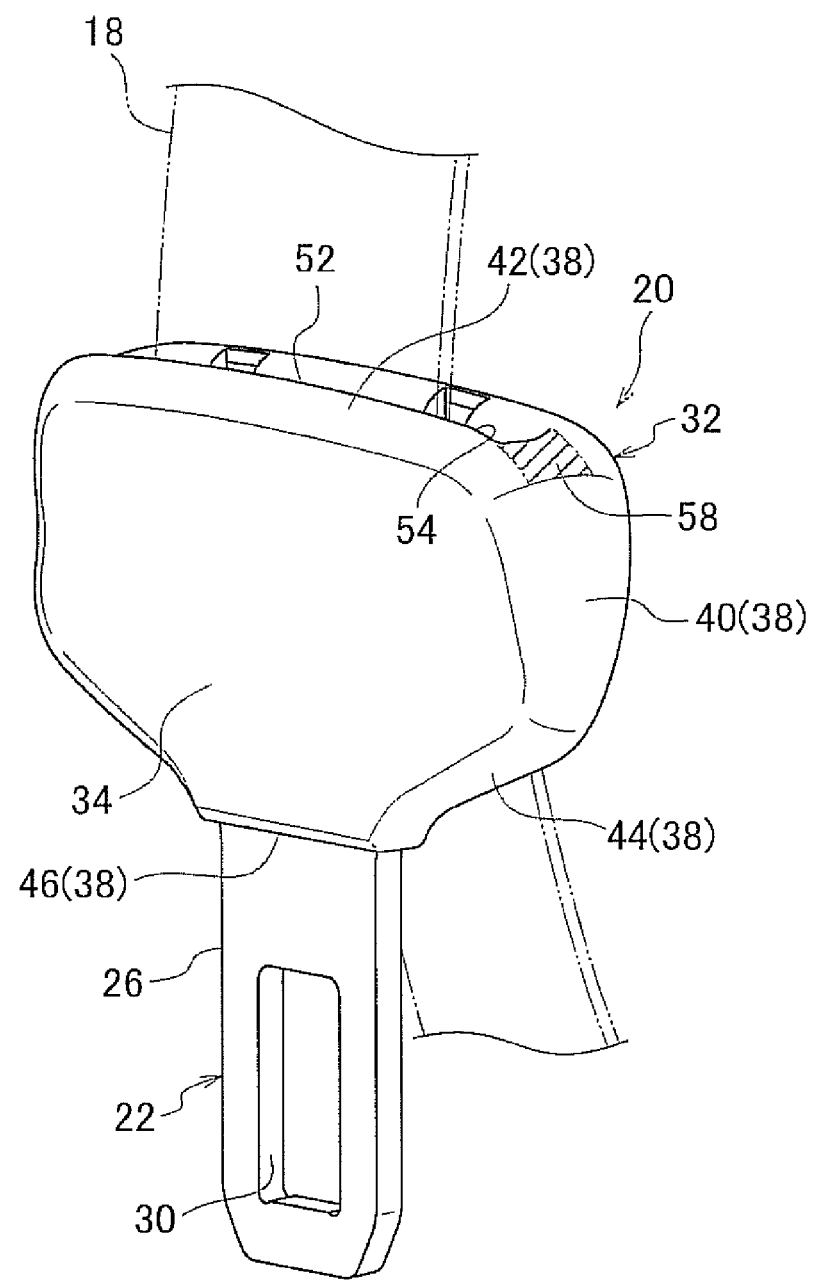
FIG. 7 is a perspective view of webbing inserted through the tongue plate shown in FIG. 2.

Also, as shown in FIG. 4, a through-hole 52 is formed in the grasping portion 32. A cross-section perpendicular to the vehicle vertical direction of this through-hole 52 has a generally long rectangular shape, with the length direction being the width direction of the tongue plate 20. The through-hole 52 extends from the top surface 42, through the through-hole 28 of the plate portion 22, and all the way to the back surface 36 of the grasping portion 32. Also, as shown in FIG. 7, the webbing 18 is inserted through this through-hole 52, and the webbing 18 extends upward with respect to the vehicle from an opening 54 of the through-hole 52 in the top surface 42.

Figure 6:
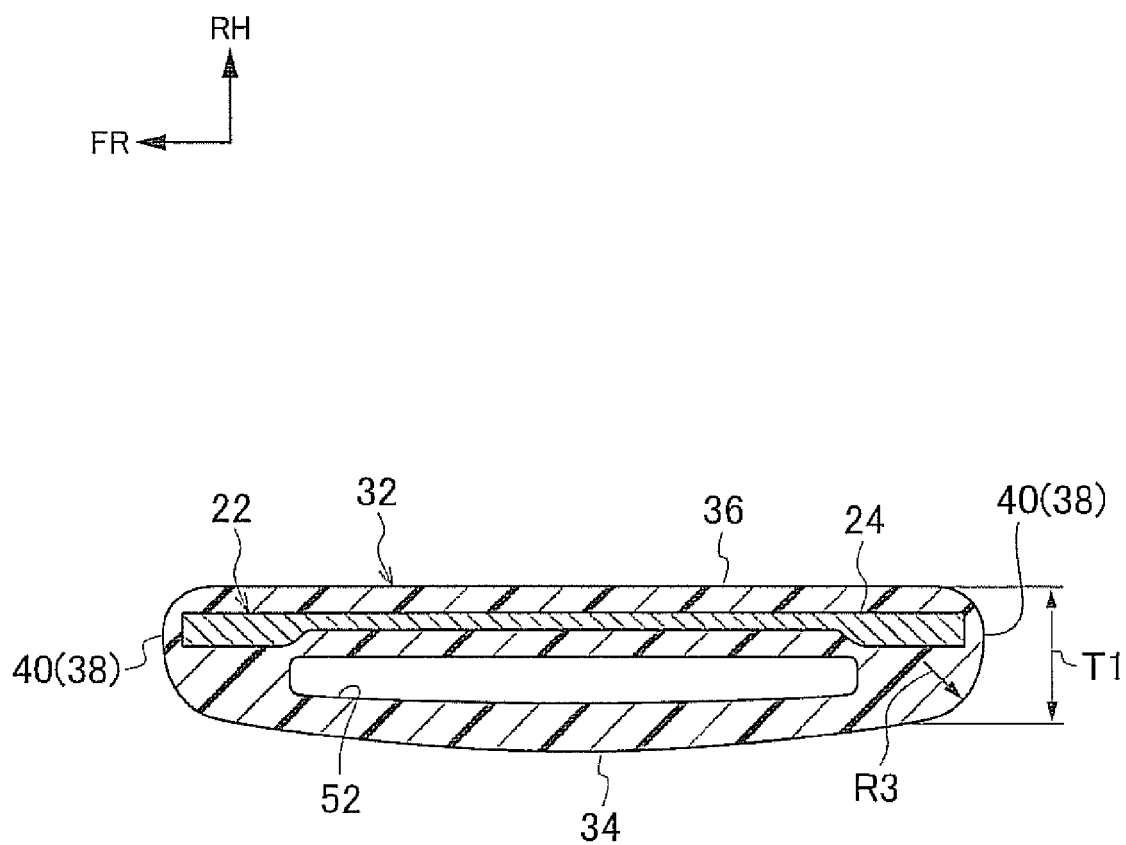
FIG. 6 is a sectional view (i.e., a sectional view taken along line 6-6 in FIG. 3) of a cross-section at a center position in an inclining direction (i.e., an inclining direction center position) of inclined surfaces of the tongue plate shown in FIG. 3.

Furthermore, as shown in FIG. 6, the front surface 34 of the grasping portion 32 is curved in a spherical shape protruding toward one side in the plate thickness direction of the plate portion 22 (i.e., toward the vehicle left side in FIG. 6). Also, edge portions of the front surface 34 are connected in a continuous manner to the outer peripheral surfaces 38. The connecting portion where the edge portions of the front surface 34 are connected to the outer peripheral surfaces 38 are curved at an angle R3 protruding to the outside of the grasping portion 32.

Also, as shown in FIG. 2, before the tongue plate 20 is fastened to the buckle device 78, the tongue plate 20 is retained by a tongue stopper, not shown, provided on the webbing 18, and arranged on the vehicle right side of the seat 72.

Here, as shown in FIG. 3, an angle A created by the inclined surface 40 with respect to the width direction of the tongue plate 20 is set to between 64° and 77°, inclusive, when viewed from the front surface 34 side of the grasping portion 32. This angle A refers to the angle created between a line B along the width direction of the tongue plate 20 and a line C that connects the center of angle R1 and the center of angle R2 together.

Also, a length L of the inclined surface 40 when viewed from the front surface 34 side of the grasping portion 32 is set to be between 25.2 mm and 40 mm, inclusive. The length L of the inclined surface 40 refers to the length from a center point P1 of angle R1 to a center point P2 of angle R2 along the inclined surfaces 40.

Furthermore, as shown in FIG. 7, the opening 54 of the through-hole 52 is arranged between both end portions in the length direction of the top surface 42. Also, the region that extends from both side portions in the width direction of the opening 54 of the outer peripheral surface 38 to both end portions in the length direction of the top surface 42 (see the region shown by diagonal lines in FIG. 7) is a restricting region 58. This restricting region 58 is formed by a surface that is continuous from both side end portions in the width direction of the opening 54 to the inclined surfaces 40. Also, when the webbing 18 moves relatively in the width direction with respect to the grasping portion 32, for example, the edge portion in the width direction of the webbing 18 will abut against the opening 54 (i.e., the restricting region 58), such that movement of the webbing 18 in the width direction is inhibited by the opening 54 (i.e., the restricting region 58).

Also, as shown in FIG. 3, when viewed from the front surface 34 side of the grasping portion 32, a width dimension W1 of the grasping portion 32 at an inclining direction center position P3 of the inclined surface 40 is set to be between 73 mm and 74 mm, inclusive. This inclining direction center position P3 is a position that is set equidistant from the center point P1 and the center point P2 along the inclined surface 40. Moreover, when viewed from the front surface 34 side of the grasping portion 32, a maximum width dimension Wmax of the grasping portion 32 is set to be 76.1 mm or less.

Further, as shown in FIG. 6, a thickness dimension T1 of the grasping portion 32 at the inclining direction center position P3 is set to be between 11 mm and 13.5 mm, inclusive, and a radius of the angle R3 is set to be 6 mm or less. The thickness dimension T1 of this grasping portion 32 refers to the length from the back surface of the grasping portion 32 to the border between the angle R3 and the front surface 34.

Next, the operation and effect of the example embodiment will be described.

When an occupant fastens the webbing 18 across his or her body, the occupant grasps the grasping portion 32 of the tongue plate 20, and pulls the tongue plate 20 and the webbing 18 toward the buckle device 78. At this time, the tongue plate 20 is pulled against the urging force of the urging spring of the retractor 12, and the winding force of the retractor 12 acts on the tongue plate 20 via the webbing 18. Also, the webbing 18 is fastened across the body of the occupant, such that the body of the occupant is restrained by the webbing 18, by fastening the engaging portion 26 of the tongue plate 20 to the buckle device 78.

Also, as shown in FIG. 1, when the occupant grasps the grasping portion 32, the fingers (i.e., the forefinger ff and the middle finger mf) of the occupant are placed on one of the inclined surfaces 40, and the palm, not shown, of the occupant is placed on the other inclined surface 40. In FIG. 1, the second joint of the forefinger ff of the occupant and the second joint of the middle finger mf of the occupant are both indicated by alternate long and two short dashes lines.

Here, a portion of the outer peripheral surface 38 when viewed from the front surface 34 side of the grasping portion 32 (i.e., one side in the plate thickness direction of the plate portion 22) is formed by the pair of inclined surfaces 40. The pair of inclined surfaces 40 are arranged one on each side portion in the width direction of the grasping portion 32. Also, the inclined surfaces 40 are arranged inclined in a direction away from each other in the extending direction of the engaging portion 26. That is, the pair of inclined surfaces 40 are arranged such that the width dimension of the grasping portion 32 on the engaging portion 26 side (i.e., on the lower side) of the grasping portion 32 is larger than the width dimension of the grasping portion 32 on the side opposite the engaging portion 26 side (i.e., on the upper side) of the grasping portion 32.

As a result, when an occupant with small hands grasps the grasping portion 32, the occupant is able to mainly grasp the portion of the grasping portion 32 where the width dimension is small, and when an occupant with large hands grasps the grasping portion 32, the occupant is able to mainly grasp the portion of the grasping portion 32 where the width dimension is large. Therefore, a difference in grasping ease due to the size of the hands of the occupant is able to be minimized.

Also, when engaging the tongue plate 20 with the buckle device 78 of the vehicle, the engaging portion 26 of the tongue plate 20 is pulled toward the buckle device 78, so winding force in a direction opposite the extending direction of the engaging portion 26 acts on the tongue plate 20 from the retractor 12. Also, as described above, the width dimension of the grasping portion 32 on the engaging portion 26 side (i.e., on the lower side) of the grasping portion 32 is set larger than the width dimension of the grasping portion 32 on the side opposite the engaging portion 26 side (i.e., on the upper side) of the grasping portion 32. That is, the direction of the winding force that acts on the tongue plate 20 does not match the direction in which the inclined surfaces 40 are inclined.

Moreover, when engaging the tongue plate 20 with the buckle device 78 of the vehicle, the occupant is able to grasp the grasping portion 32 taking the pair of inclined surfaces 40. As a result, the grasping ease of the grasping portion 32 is able to be improved.

Figure 8:
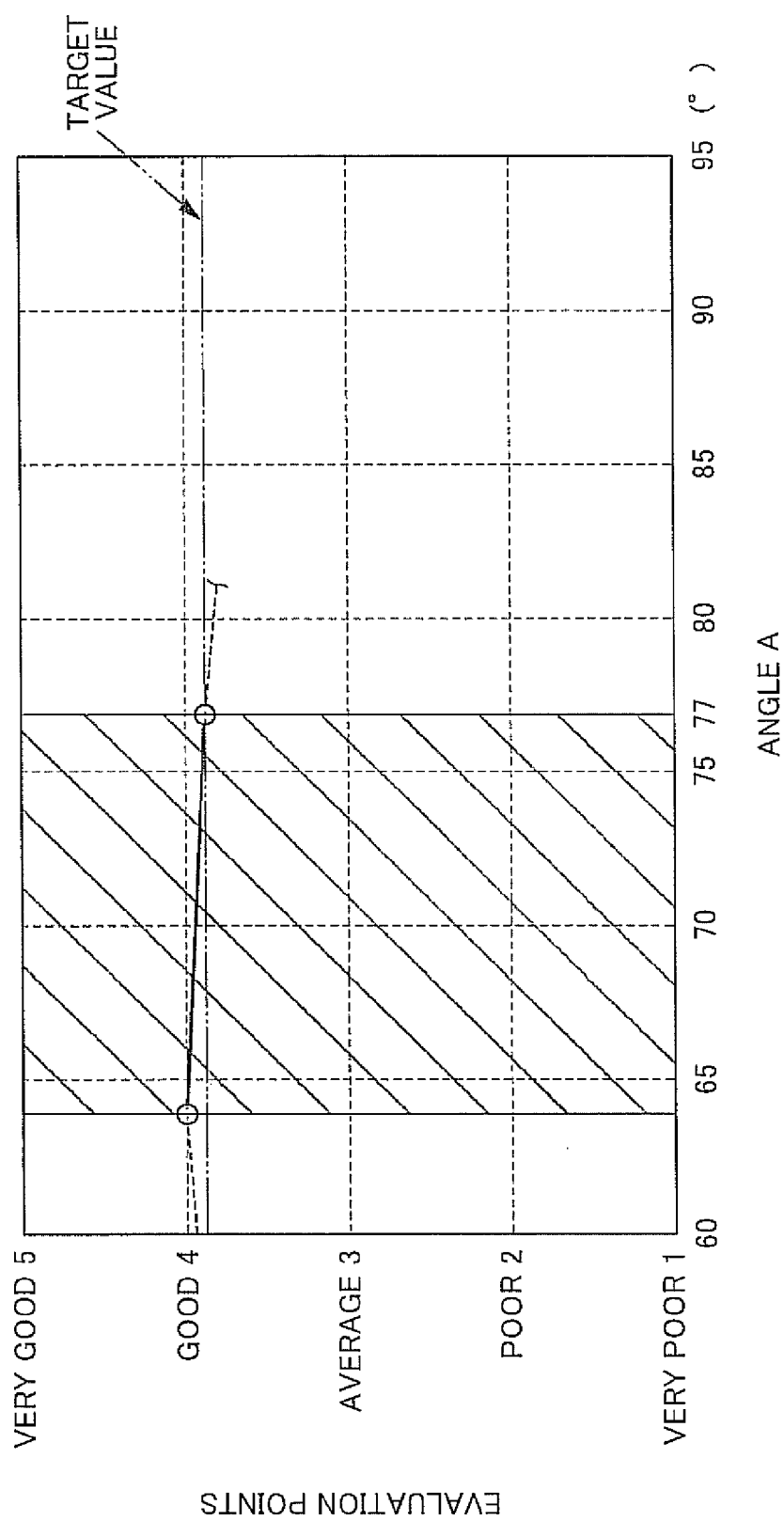
FIG. 8 is a view illustrating the relationship between grasping ease and the inclined surfaces of the tongue plate shown in FIG. 1.

Also, when viewed from the front surface 34 side of the grasping portion 32, the inclined surfaces 40 are arranged inclined with respect to the width direction of the grasping portion 32, and the angle A created by the inclined surfaces 40 with respect to the width direction of the grasping portion 32 is set to between 64° and 77°, inclusive. As a result, the grasping ease of the grasping portion 32 is able to be further improved. This point will be described with reference to FIG. 8. FIG. 8 is a graph showing the evaluation results of an evaluation of the grasping ease of the grasping portion 32 with respect to the angle A. Also, the horizontal axis in FIG. 8 represents the angle of angle A, and the vertical axis in FIG. 8 represents the grasping ease evaluation value. In this evaluation, the grasping ease of the grasping portion 32 is evaluated on a 5-point scale, with 1 being very poor, 2 being poor, 3 being average, 4 being good, and 5 being very good. Also, the target value for the grasping ease with respect to the angle A is 3.8 or higher.

As shown in this drawing, when the angle A was set to 77°, the evaluation value was 3.8, and when the angle A was set to 64°, the evaluation value was 4. Also, if the angle A is set to less than 64°, the fingers of the occupant tend to slip on the inclined surface 40 toward the upper side of the inclined surface 40 (i.e., toward the portion where the width dimension of the grasping portion 32 is small), and as a result, the grasping ease of the grasping portion 32 with respect to the angle A deteriorates. Therefore, there is a tendency for the evaluation value in this case to be lower than 4 (see the line indicated by the dotted line in FIG. 8). On the other hand, if the angle A is set to greater than 77°, the direction in which winding force acts on the tongue plate 20 and the direction in which the inclined surfaces 40 become inclined come closer to matching each other when the tongue plate 20 is engaged with the buckle device 78. Therefore, when engaging the tongue plate 20 with the buckle device 78, the fingers of the occupant tend to slip on the inclined surface 40. Hence in this case, the grasping ease of the grasping portion 32 with respect to the angle A deteriorates, and the evaluation value tends to be lower than 3.8 (see the line indicated by the dotted line in FIG. 8). Therefore, by setting the angle A to between 64° and 77°, inclusive, (i.e., within the range indicated by the slanted lines in FIG. 8), slipping of the hand (i.e., the fingers) of the occupant on the inclined surfaces 40 is suppressed, so grasping ease of the grasping portion 32 is able to be even further improved.

Also, the length L of each inclined surface 40 viewed from the front surface 34 side of the grasping portion 32 is set to be between 25.2 mm and 40 mm, inclusive. As a result, the length L of the inclined surface 40 is able to be set to a length that is long enough for the occupant to be able to grasp. This point will be described with reference to FIG. 1. As described above, in FIG. 1, the second joint of the forefinger ff and the second joint of the middle finger mf of the occupant when the occupant is grasping the grasping portion 32 are indicated by alternate long and two short dashes lines. Also, when setting the length L of the inclined surface 40, the length L of the inclined surface 40 is preferably set equal to or longer than the minimum length at which the fingers of the occupant are able to be placed on the inclined surface 40, even when an occupant with relatively large hands (i.e., an occupant corresponding to JM95 (a Japanese adult male of a height that is within the shortest 95% when Japanese adult males are lined up in order from shortest to tallest) grasps the grasping portion 32.

Also, the finger width of an occupant corresponding to JM95 was measured, and the width dimension of the forefinger was assumed to be 18 mm, and the width dimension of the middle finger was assumed to be 18 mm. Furthermore, even when the length L of the inclined surface 40 is set to a height of 70% of the sum of the width dimension of the forefinger and the width dimension of the middle finger of an occupant corresponding to JM95, it is evident that the occupant is able to grasp the grasping portion 32 by placing his forefinger and middle finger on the inclined surface 40.

That is, the length L of the inclined surface 40 in this case is 18 mm×2×0.7=25.2 mm. If the length L of the inclined surface 40 is smaller than 25.2 mm, the forefinger ff will tend to be placed on the top surface 42 side and the middle finger mf will tend to be placed on the first bottom surface 44 side. As a result, if the length L of the inclined surface 40 is set smaller than 25.2 mm, the gripping ease of the grasping portion 32 with respect to the length L of the inclined surface 40 deteriorates. On the other hand, by setting the length L of the inclined surface 40 to 25.2 mm or larger, the grasping portion 32 is able to be grasped by placing the forefinger ff and the middle finger mf on the inclined surface 40, even with an occupant that has relatively large hands.

Also, when setting the length L of the inclined surface 40, the maximum length of the length L is preferably set while keeping the grasping portion 32 from becoming larger. As described above, a length of 100% of the sum of the width dimension of the forefinger and the width dimension of the middle finger of an occupant corresponding to JM95 is 18 mm×2=36 mm. Therefore, by setting the maximum length of the length L of the inclined surface 40 to 40 mm or less, the length L of the inclined surface 40 is able to be set sufficiently long for an occupant corresponding to JM95. Thus, the length L of the inclined surface 40 is able to be set to a length that is long enough for the occupant to be able to grasp.

Also, as shown in FIG. 4, the opening 54 of the through-hole 52 through which the webbing 18 passes is formed in the top surface 42 of the grasping portion 32, and the opening 54 is arranged between both end portions in the length direction of the top surface 42. That is, the opening 54 is not arranged in the inclined surfaces 40, so each inclined surface 40 is formed as a continuous surface. Also, the portion of the outer peripheral surface 38 that extends from both side portions in the width direction of the opening 54 to both end portions in the width direction of the top surface 42 is the restricting region 58, so movement of the webbing 18 in the width direction of the webbing 18 is inhibited by this restricting region 58. As a result, the grasping ease of the grasping portion 32 of the tongue plate 20 is able to be effectively improved.

Figure 9:
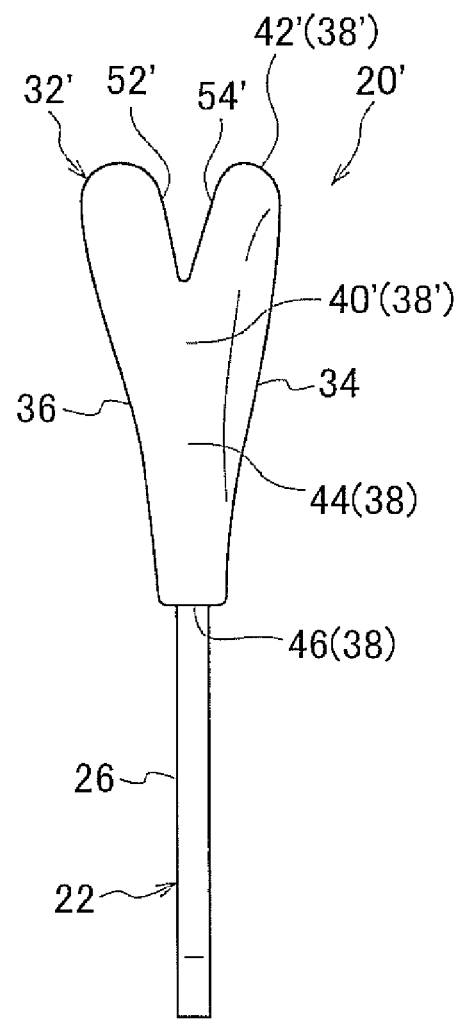
FIG. 9 is a side view of a tongue plate of a comparative example.

This point will be described with reference to FIG. 10 while comparing the example embodiment with a comparative example shown in FIG. 9. FIG. 9 is a view of a tongue plate 20' of the comparative example. This tongue plate 20' has a shape similar to that of the tongue plate 20 of the example embodiment except for the points described below. In FIG. 9, portions that are shaped similar to portions of the tongue plate 20 are denoted by the same reference numerals used to denote portions of the tongue plate 20.

With the tongue plate 20' of the comparative example, the restricting region 58 of the example embodiment is omitted, and an opening 54' of a through-hole 52' of the tongue plate 20' is formed in a general U-shape that opens upward when viewed from the side. In other words, when viewed from the side, an outer peripheral surface 38' of the tongue plate 20' is notched (i.e., recessed) downward (toward the inclined surface 40 side) by the opening 54', and the opening 54' extends to an inclined surface 40'.

Also, FIG. 10 is a graph showing the evaluation results of an evaluation of grasping ease of the grasping portion 32 between the tongue plate 20' of the comparative example and the tongue plate 20 of the example embodiment. The vertical axis in FIG. 10 represents the evaluation value of the grasping ease. FIG. 10 shows the average of the evaluation values when five occupants grasped the tongue plate 20 and the tongue plate 20'. In this evaluation, the grasping ease of the grasping portion 32' and 32 was evaluated on a 5-point scale, with 1 being very poor, 2 being poor, 3 being average, 4 being good, and 5 being very good. Also, the target value for the grasping ease with respect to the outer peripheral surface 38 is 3.8 or higher.

When an occupant grasps the grasping portion 32' of the tongue plate 20' of the comparative example, the fingers and palm of the occupant end up being placed such that they go into the notched portion of the outer peripheral surface 38' of the grasping portion 32'. Therefore, the contact area of the fingers of the occupant and the outer peripheral surface 38' is smaller. In addition, when the webbing 18 moves in the width direction relative to the grasping portion 32', for example, the edge portion of the webbing 18 contacts the fingers and palm of the occupant, which may bother the occupant. As a result, the grasping ease is worse with the tongue plate 20' of the comparative example.

On the other hand, with the tongue plate 20 of the example embodiment, the inclined surfaces 40 are each formed as a continuous surface, so the fingers and palm of the occupant are inhibited from going into the notched portion of the grasping portion 32' as they do with the comparative example. As a result, the contact area of the fingers of the occupant and the inclined surface 40 (i.e., the outer peripheral surface 38) is able to be ensured. Moreover, when the webbing 18 moves in the width direction relative to the grasping portion 32, for example, contact between the fingers and palm of the occupant and the edge portion of the webbing 18 in the width direction is inhibited by the restricting region 58. Therefore, as shown in FIG. 10, with this example embodiment, the grasping ease with respect to the outer peripheral surface 38 is able to be better than it is with the comparative example. Accordingly, the grasping ease of the grasping portion 32 of the tongue plate 20 is able to be effectively improved.

Also, when viewed from the front surface 34 side of the grasping portion 32, the width dimension W1 of the grasping portion 32 at the inclining direction center position P3 of the inclined surface 40 is set to be between 73 mm and 74 mm, inclusive, and the maximum width dimension Wmax of the grasping portion 32 is set to be 76.1 mm or less. As a result, a width dimension of the grasping portion 32 that enables the occupant to better grasp the grasping portion 32 is able to be set. This point will be described with reference to FIGS. 11 and 12.

Figure 11:
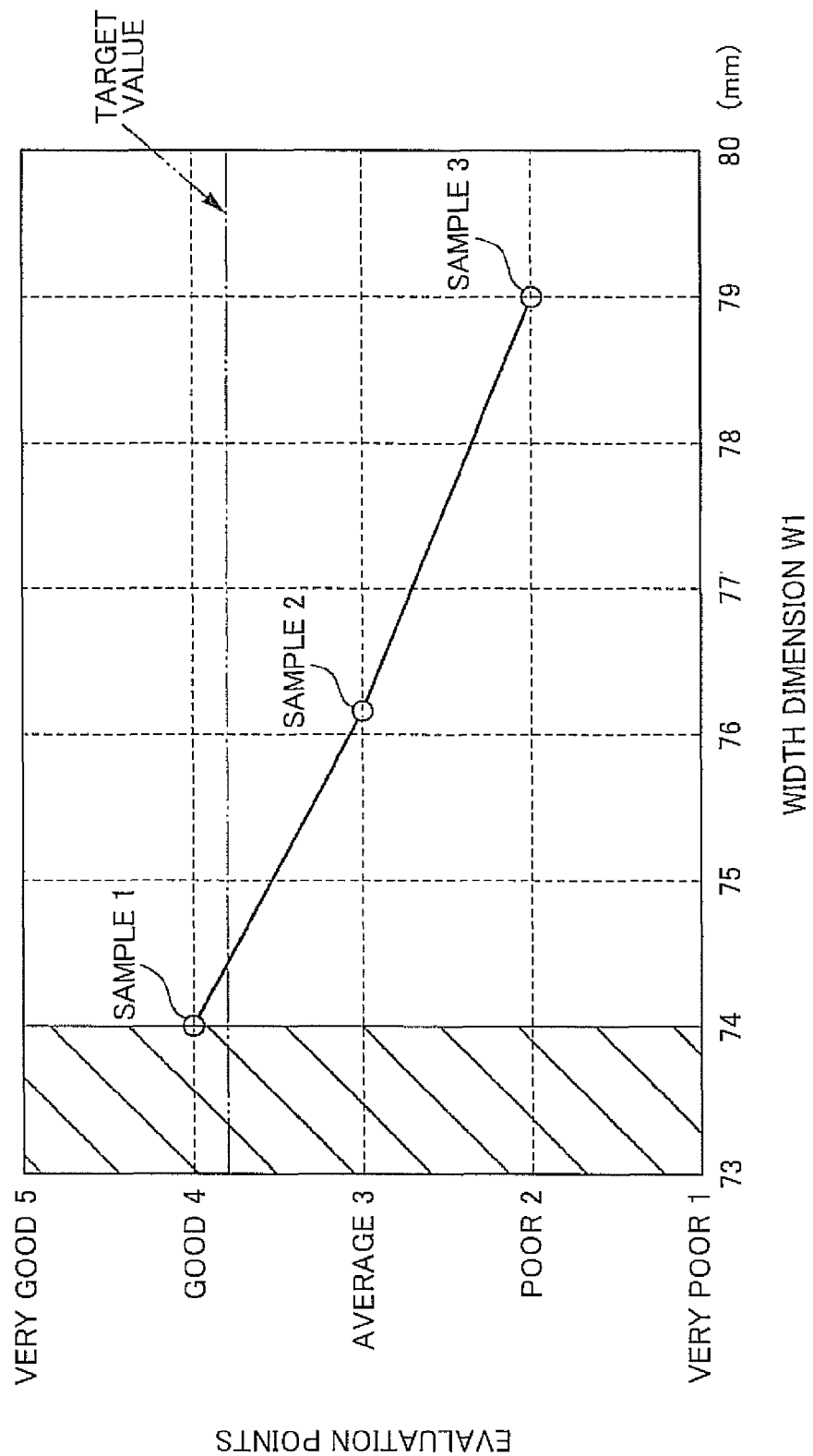
FIG. 11 is a view illustrating the relationship between grasping ease and the width dimension of the tongue plate shown in FIG. 1.
Figure 12:
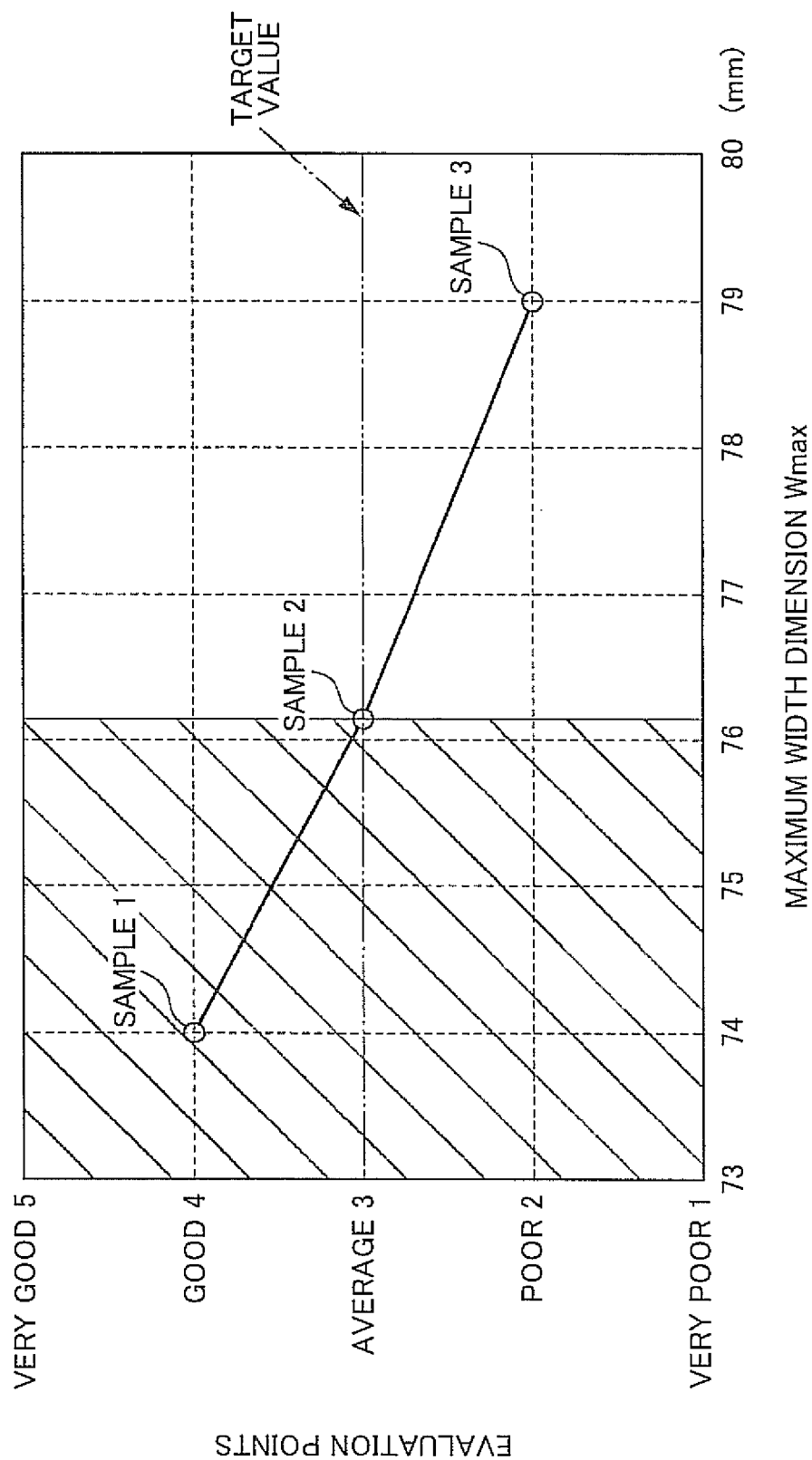
FIG. 12 is a view illustrating the relationship between grasping ease and the maximum width dimension of the tongue plate shown in FIG. 1.

FIG. 11 is a graph showing the evaluation results of an evaluation of grasping ease of the grasping portion 32 with respect to the width dimension W1. The horizontal axis in FIG. 11 represents the length of the width dimension W1, and the vertical axis in FIG. 11 represents the evaluation value of the grasping ease. Also, FIG. 12 is a graph showing the evaluation results of an evaluation of grasping ease of the grasping portion 32 with respect to the maximum width dimension Wmax. The horizontal axis in FIG. 12 represents the length of the maximum width dimension Wmax, and the vertical axis in FIG. 12 represents the evaluation value of the grasping ease. In the evaluations shown in FIGS. 11 and 12, the grasping ease of the grasping portion 32 is evaluated on a 5-point scale, with 1 being very poor, 2 being poor, 3 being average, 4 being good, and 5 being very good. Also, the target value for the grasping ease with respect to the width dimension W1 is 3.8 or higher, and the target value for the grasping ease with respect to the maximum width dimension Wmax is 3 or higher.

First, the size of the through-hole 52 through which the webbing 18 is inserted is able to be ensured by making the width dimension W1 of the grasping portion 32 73 mm or larger. Further, when setting the width dimension W1 and the maximum width dimension Wmax of the grasping portion 32, the width dimension W1 and the maximum width dimension Wmax of the grasping portion 32 are preferably set such that the occupant is able to better grasp the grasping portion 32, even when an occupant with relatively small hands (e.g., an occupant corresponding to AF05 (i.e., an American adult female of a height that is within the shortest 5% when American adult females are lined up in order from shortest to tallest)) grasps the grasping portion 32.

Also, as shown in FIG. 11, the grasping ease of the grasping portion 32 was evaluated by having an occupant corresponding to AF05 grasp each of three samples, Sample 1 having a width dimension W1 of 74 mm, Sample 2 having a width dimension W1 of 76.1, and Sample 3 having a width dimension W1 of 79 mm. For the results, the evaluation value of Sample 1 was 4, the evaluation value of Sample 2 was 3, and the evaluation value of Sample 3 was 2. When these points are connected together, the solid line shown in FIG. 11 is obtained. Thus, the width dimension W1 that enables the occupant to better grasp the grasping portion 32 is preferably set to between 73 mm and 74 mm, inclusive (i.e., the range indicated by the slanted lines in FIG. 11).

Similarly, as shown in FIG. 12, the grasping ease of the grasping portion 32 was evaluated by having an occupant corresponding to AF05 grasp each of three samples, Sample 1 having a maximum width dimension Wmax of 74 mm, Sample 2 having a maximum width dimension Wmax of 76.1, and Sample 3 having a maximum width dimension Wmax of 79 mm. For the results, the evaluation value of Sample 1 was 4, the evaluation value of Sample 2 was 3, and the evaluation value of Sample 3 was 2. When these points are connected together, the solid line shown in FIG. 12 is obtained. Thus, the maximum width dimension Wmax that enables the occupant to better grasp the grasping portion 32 is preferably set to 76.1 or less (i.e., the range indicated by the slanted lines in FIG. 12).

That is, if the width dimension W1 of the grasping portion 32 is set to greater than 74 mm and the maximum width dimension Wmax of the grasping portion 32 is set to greater than 76.1 mm, the hand of an occupant corresponding to AF05 when the occupant grasps the grasping portion 32 will be stretched, so the grasping ease of the grasping portion 32 is worse.

With respect to this, by setting the width dimension W1 of the grasping portion 32 to between 73 mm and 74 mm, inclusive, and setting the maximum width dimension Wmax of the grasping portion 32 to 76.1 mm or less, it is possible to keep the hand of an occupant corresponding to AF05 from being stretched when the occupant grasps the grasping portion 32. As a result, a width dimension of the grasping portion 32 that enables the occupant to better grasp the grasping portion 32 is able to be set.

Figure 13:
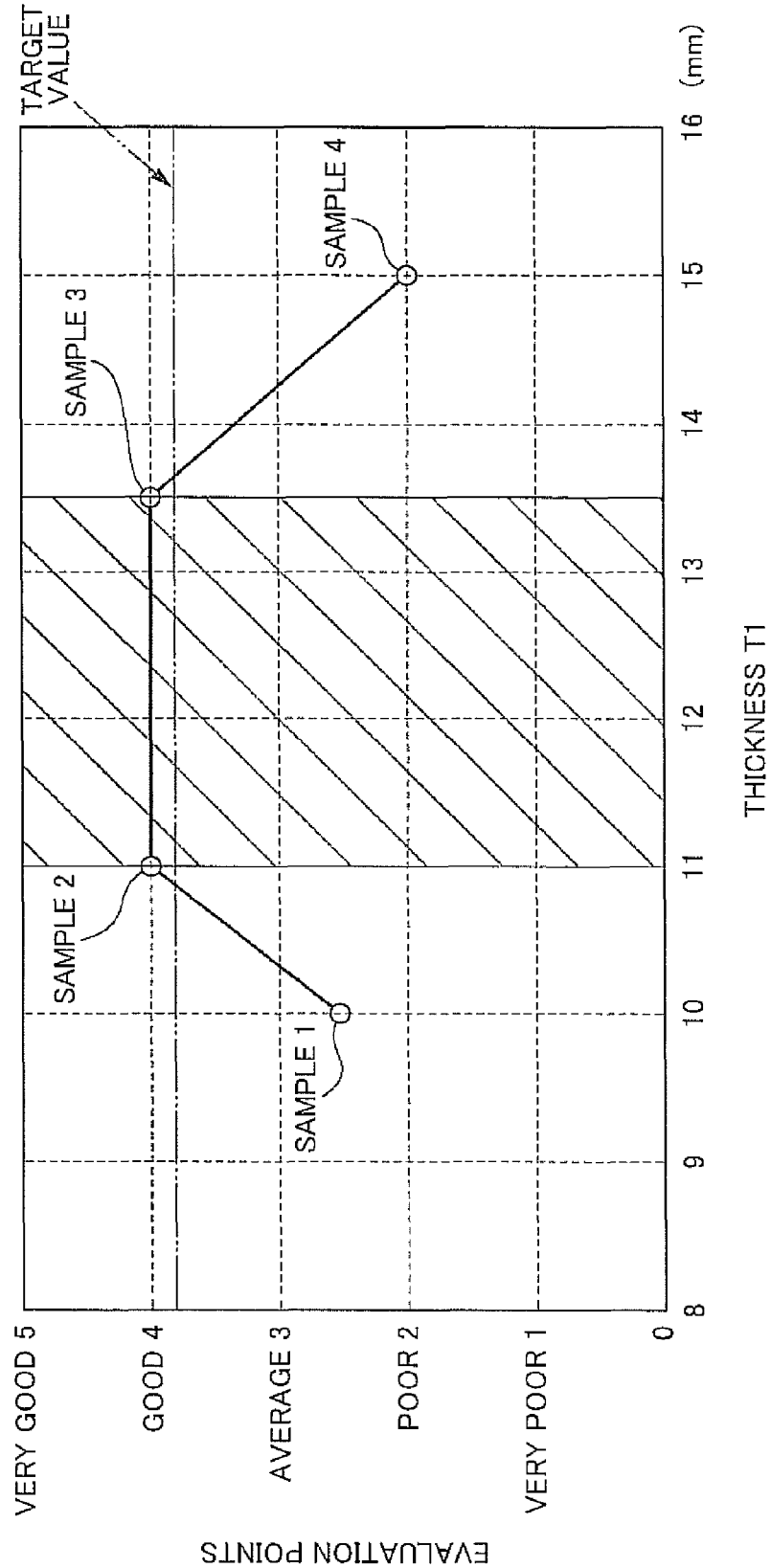
FIG. 13 is a view illustrating the relationship between grasping ease and the thickness dimension of the tongue plate shown in FIG. 1.

Also, a thickness dimension T1 of the grasping portion 32 at the inclining direction center position P3 of the inclined surface 40 is set to between 11 mm and 13.5 mm, inclusive. As a result, a thickness dimension of the grasping portion 32 that enables the occupant to better grasp the grasping portion 32 is able to be set. This point will be described with reference to FIG. 13. FIG. 13 is a graph showing the evaluation results of an evaluation of grasping ease of the grasping portion 32 with respect to the thickness T1. The horizontal axis in FIG. 13 represents the length of the thickness T1, and the vertical axis in FIG. 13 represents the evaluation of the grasping ease. In this evaluation, the grasping ease of the grasping portion 32 is evaluated on a 5-point scale, with 1 being very poor, 2 being poor, 3 being average, 4 being good, and 5 being very good. Also, the target value for the grasping ease with respect to the thickness T1 is 3.8 or higher.

As shown in the drawing, the grasping ease of the grasping portion 32 was evaluated by having an occupant corresponding to AF05 grasp each of four samples, Sample 1 having a thickness T1 of 10 mm, Sample 2 having a thickness T1 of 11 mm, Sample 3 having a thickness T1 of 13.5 mm, and Sample 4 having a thickness T1 of 15 mm. For the results, the evaluation value of Sample 1 was 2.5, the evaluation value of Sample 2 was 4, the evaluation value of Sample 3 was 4, and the evaluation value of Sample 4 was 2. When these points are connected together, the solid line shown in FIG. 13 is obtained. Thus, the thickness T1 that enables the occupant to better grasp the grasping portion 32 is preferably set to between 11 mm and 13.5 mm, inclusive (i.e., the range indicated by the slanted lines in FIG. 13).

That is, if the thickness T1 is set smaller than 11 mm, the outer peripheral surface of the grasping portion 32 will feel like an edge (i.e., feel sharp) to the fingers of the occupant, and grasping ease of the grasping portion 32 will be worse. On the other hand, if the thickness T1 is set greater than 13.5, the outer peripheral portion will contact the second joint of the fingers of the occupant, which may bother the occupant, so the grasping ease of the grasping portion 32 will be worse. In contrast, setting the thickness T1 to between 11 mm and 13.5 mm, inclusive, (i.e., within the range indicated by the slanted lines in FIG. 13) enables the outer peripheral surface 38 of the grasping portion 32 to be arranged to fit in the fingers of the occupant, so the grasping ease of the grasping portion 32 is able to be better.

Furthermore, the edge portion of the front surface 34 is connected in a continuous manner to the outer peripheral surface 38, and the radius of the angle R3 where the edge portion of the front surface 34 is connected to the outer peripheral surface 38 is 6 mm or more. As a result, a protruding feeling felt by the occupant when the occupant grasps the grasping portion 32 is able to be minimized.

Moreover, the front surface 34 of the grasping portion 32 is curved in a spherical shape so as to protrude out toward one side in the plate thickness direction of the plate portion 22. The grasping ease of the grasping portion 32 is able to be even more effectively improved. That is, the grasping portion 32 fits in the hand of the occupant by the occupant grasping the grasping portion 32 by wrapping his or her hand around the front surface 34 of the grasping portion 32, which enables the grasping ease of the grasping portion 32 to be even more effectively improved.

In this example embodiment, the inclined surface 40 is curved so as to protrude toward the outside of the grasping portion 32, but the inclined surface 40 may also be formed in a linear fashion when viewed from the front surface 34 side. In this case, the angle A is the angle at which the inclined surface 40 that is linear when viewed from the plate thickness direction of the plate portion 22 is inclined with respect to the width direction of the tongue plate 20.

Also, in this example embodiment, the connecting portion where the top surface 42 connects to the inclined surface 40 when viewed from the front surface 34 side is connected at the angle R1, and the connecting portion where the first bottom surface 44 connects to the inclined surface 40 is connected at the angle R2, but the angle R1 and the angle R2 may also be omitted. In this case, the angle at which a line that connects the boundary P1 between the top surface 42 and the inclined surface 40 to the boundary P2 between the first bottom surface 44 and the inclined surface 40 is inclined with respect to the width direction of the tongue plate 20 is angle A. Also, the distance along the inclined surface 40 from the boundary P1 between the top surface 42 and the inclined surface 40 to the boundary P2 between the first bottom surface 44 and the inclined surface 40 is the length L of the inclined surface 40.

Figure 14:
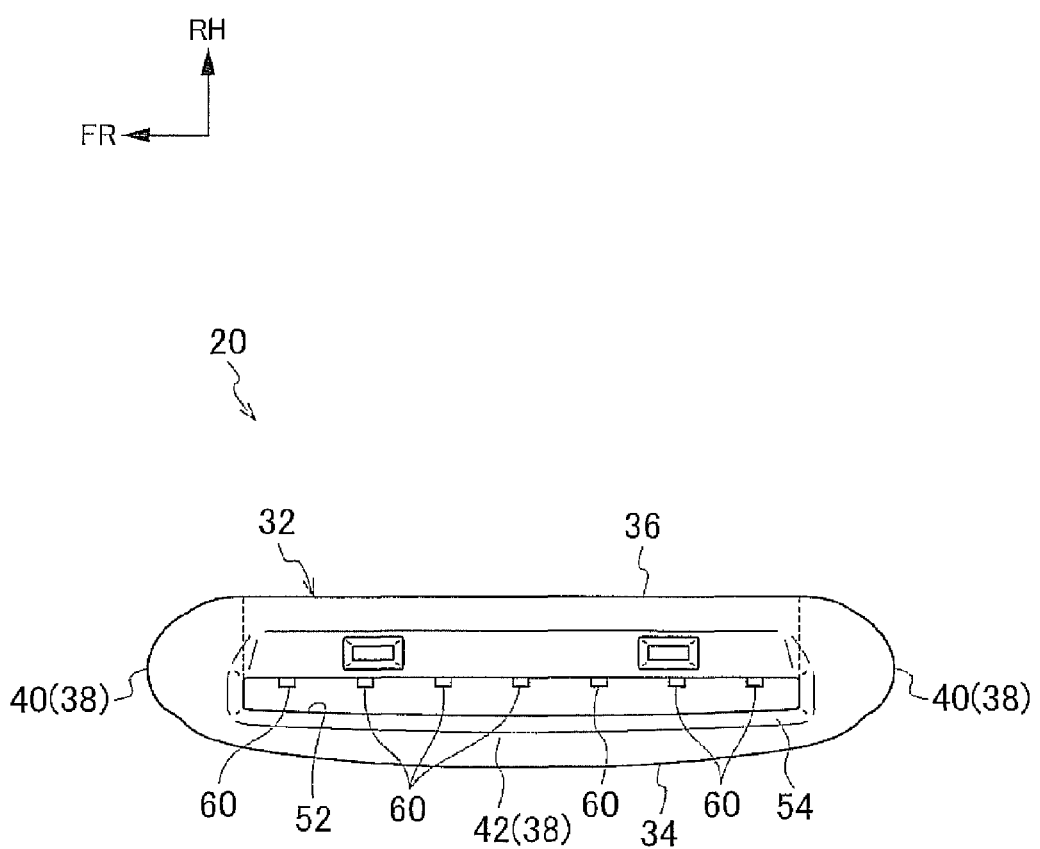
FIG. 14 is a plan view of the tongue plate according to the example embodiment.

Moreover, in this example embodiment, the cross-section of the through-hole 52 is formed in a generally long rectangular shape, but a plurality of ribs 60 may also be formed inside the through-hole 52 as shown in FIG. 14. More specifically, the ribs 60 are formed extending in the vehicle vertical direction, and protruding toward the front surface 34 side of the grasping portion 32 from the surface on the back surface 36 side of the grasping portion 32 in the through-hole 52. As a result, the sliding resistance of the webbing 18 and the grasping portion 32 is reduced, which contributes to an improvement in the grasping ease of the grasping portion 32 for the occupant.

Also, a plurality of recessed portions with a shallow groove depth may also be formed on the inclined surface 40 of the grasping portion 32 of the example embodiment. As a result, the grippability of the grasping portion 32 for the occupant is able to be improved. Furthermore, recessed portions corresponding to the shapes of the fingers of the occupant may also be formed on the inclined surface 40 of the grasping portion 32 of this example embodiment. In this case as well, the side surface of the grasping portion 32 may be arranged such that the width dimension of the grasping portion 32 on the engaging portion 26 side (i.e., on the lower side) of the grasping portion 32 is larger than the width dimension of the grasping portion 32 on the side opposite the engaging portion 26 side (i.e., on the upper side) of the grasping portion 32.

Further, in the example embodiment, the grasping portion 32 is made of resin. Alternatively, for example, the portion of the inclined surface 40 of the grasping portion 32 may be made of an elastomer, and the grasping portion 32 may be formed by two-color molding.

While the exemplary embodiments have been described, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less, or only a single element, are also within the spirit and scope of the invention.

What is claimed is:

1. A tongue plate comprising:
   a grasping portion through which webbing for restraining an occupant is inserted and that is grasped by the occupant; and
   a plate portion that includes an engaging portion,
   wherein the engaging portion is integrated with the grasping portion, and extends from the grasping portion, and is able to engage with a buckle device of a vehicle; and
   wherein the grasping portion includes a pair of side surfaces, the side surfaces forming a portion of an outer peripheral surface of the grasping portion when viewed from a plate thickness direction of the plate portion, and being arranged one on each side portion in a width direction of the grasping portion, the side surfaces being arranged such that a width dimension of the grasping portion on the engaging portion side of the grasping portion is larger than a width dimension of the grasping portion on a side opposite the engaging portion side of the grasping portion,
   wherein the side surfaces are arranged inclined with respect to the width direction of the grasping portion when viewed from the plate thickness direction of the plate portion, and an angle created by the side surfaces with respect to the width direction of the grasping portion is set to between 64° and 77°, inclusive.

2. The tongue plate according to claim 1, wherein a length of each of the side surfaces when viewed from the plate thickness direction of the plate portion is set to between 25.2 mm and 40 mm, inclusive.

3. The tongue plate according to claim 1, wherein the grasping portion includes a top surface, and the top surface is a portion of the outer peripheral surface, and is a surface that connects together end portions of the side surfaces that are on the side opposite the engaging portion side of the side surfaces; and
   the top surface has an opening of a through-hole through which the webbing is inserted, and the opening is arranged between both end portions in a width direction of the top surface.

4. The tongue plate according to claim 1, wherein the width dimension of the grasping portion at a center position in an inclining direction of each of the side surfaces when viewed from the plate thickness direction of the plate portion is set to between 73 mm and 74 mm, inclusive, and a maximum width dimension of the grasping portion is set to 76.1 mm or less.

5. The tongue plate according to claim 1, wherein a thickness dimension of the grasping portion at a center position in an inclining direction of each of the side surfaces when viewed from the plate thickness direction of the plate portion is set to between 11 mm and 13.5 mm, inclusive.

6. The tongue plate according to claim 1, wherein a surface on one side, in the plate thickness direction of the plate portion, of the grasping portion is curved in a spherical shape so as to protrude toward one side in the plate thickness direction of the plate portion.

7. A vehicle seatbelt apparatus comprising:
   the tongue plate according to claim 1;
   the webbing that has a long band shape; and
   a retractor that includes a spool, the spool winding the webbing by being rotated in a winding direction, and the spool being rotated in a withdrawing direction by the webbing being withdrawn.

8. The tongue plate according to claim 1, wherein the grasping portion includes a top surface and a pair of bottom surfaces, and the top surface is a portion of the outer peripheral surface, and is a surface that connects together end portions of the side surfaces that are on a side opposite the engaging portion side of the side surfaces; and the bottom surfaces are portions of the outer peripheral surface, and are surfaces that connect end portions on the engaging portion side of the side surfaces to the plate portion.

* * * * *